(12) United States Patent
Ochi et al.

(10) Patent No.: US 10,829,395 B2
(45) Date of Patent: Nov. 10, 2020

(54) FLOWING-WATER STERILIZATION SYSTEM

(71) Applicant: NIKKISO CO., LTD., Tokyo (JP)

(72) Inventors: Tetsumi Ochi, Tokyo (JP); Shinya Watanabe, Tokyo (JP); Jin Takano, Tokyo (JP); Takashi Okamoto, Tokyo (JP)

(73) Assignee: NIKKISO CO., LTD., Tokyo (JP)

( * ) Notice: Subject to any disclaimer, the term of this patent is extended or adjusted under 35 U.S.C. 154(b) by 0 days.

(21) Appl. No.: 16/663,648

(22) Filed: Oct. 25, 2019

(65) Prior Publication Data

US 2020/0071196 A1 Mar. 5, 2020

Related U.S. Application Data

(63) Continuation of application No. 16/100,431, filed on Aug. 10, 2018, now Pat. No. 10,590,014.

(30) Foreign Application Priority Data

Aug. 21, 2017 (JP) .................................. 2017-158863
May 28, 2018 (JP) .................................. 2018-101512

(51) Int. Cl.
C02F 1/32 (2006.01)
C02F 103/08 (2006.01)

(52) U.S. Cl.
CPC .......... C02F 1/325 (2013.01); *C02F 2103/08* (2013.01); *C02F 2201/326* (2013.01);
(Continued)

(58) Field of Classification Search
CPC ...... C02F 1/00; C02F 1/30; C02F 1/32; C02F 1/325
(Continued)

(56) References Cited

U.S. PATENT DOCUMENTS 9,260,323 B2  2/2016  Boodaghians et al.
2002/0043504 A1* 4/2002 Chen ........................ A61L 2/10
250/455.11

(Continued)

FOREIGN PATENT DOCUMENTS

JP  2005-296847 A  10/2005
WO  2014/115146 A1  7/2014

OTHER PUBLICATIONS

Advisory Action dated Oct. 16, 2019 received in related application U.S. Appl. No. 16/100,431.
(Continued)

*Primary Examiner* — Jason L McCormack
(74) *Attorney, Agent, or Firm* — Scully, Scott, Murphy & Presser, P.C.

(57) ABSTRACT

Provided is a flowing-water sterilization system that includes a flow channel for passing seawater to be sterilized, and a light source emitting ultraviolet light to irradiate the seawater passing through the flow channel, wherein the light source includes a light-emitting diode that emits light not including infrared light. The light-emitting diode may emit ultraviolet light that has a wavelength of not less than 250 nm and not more than 350 nm and does not include light with a wavelength of not more than 200 nm. The system may further include a cooling unit for cooling the light source.

26 Claims, 4 Drawing Sheets

(52) U.S. Cl.
CPC ............ *C02F 2201/3222* (2013.01); *C02F 2201/3225* (2013.01); *C02F 2201/3228* (2013.01); *C02F 2209/40* (2013.01); *C02F 2303/04* (2013.01); *C02F 2303/20* (2013.01); *C02F 2303/22* (2013.01)

(58) Field of Classification Search
USPC .......................................................... 250/435
See application file for complete search history.

(56) References Cited

U.S. PATENT DOCUMENTS

| | | | | |
|---|---|---|---|---|
| 2009/0139918 | A1* | 6/2009 | Alper | B63J 4/002 |
| | | | | 210/95 |
| 2009/0250626 | A1 | 10/2009 | Schlesser et al. | |
| 2010/0090840 | A1* | 4/2010 | Schreiner | B64D 11/02 |
| | | | | 340/600 |
| 2011/0278467 | A1 | 11/2011 | Tanaka | |
| 2014/0166590 | A1 | 6/2014 | Rozenberg et al. | |
| 2014/0166897 | A1 | 6/2014 | Rozenberg et al. | |
| 2015/0129776 | A1* | 5/2015 | Boodaghians | C02F 1/325 |
| | | | | 250/432 R |
| 2015/0144575 | A1* | 5/2015 | Hawkins, II | C02F 1/325 |
| | | | | 210/748.11 |
| 2016/0075568 | A1* | 3/2016 | Hansson | C02F 1/325 |
| | | | | 422/186.3 |
| 2017/0240437 | A1* | 8/2017 | Duvall | C02F 1/325 |

OTHER PUBLICATIONS

Final Office Action dated Jul. 29, 2019 received in related application U.S. Appl. No. 16/100,431.

Non-Final Office Action dated Mar. 29, 2019 received in related application U.S. Appl. No. 16/100,431.

\* cited by examiner

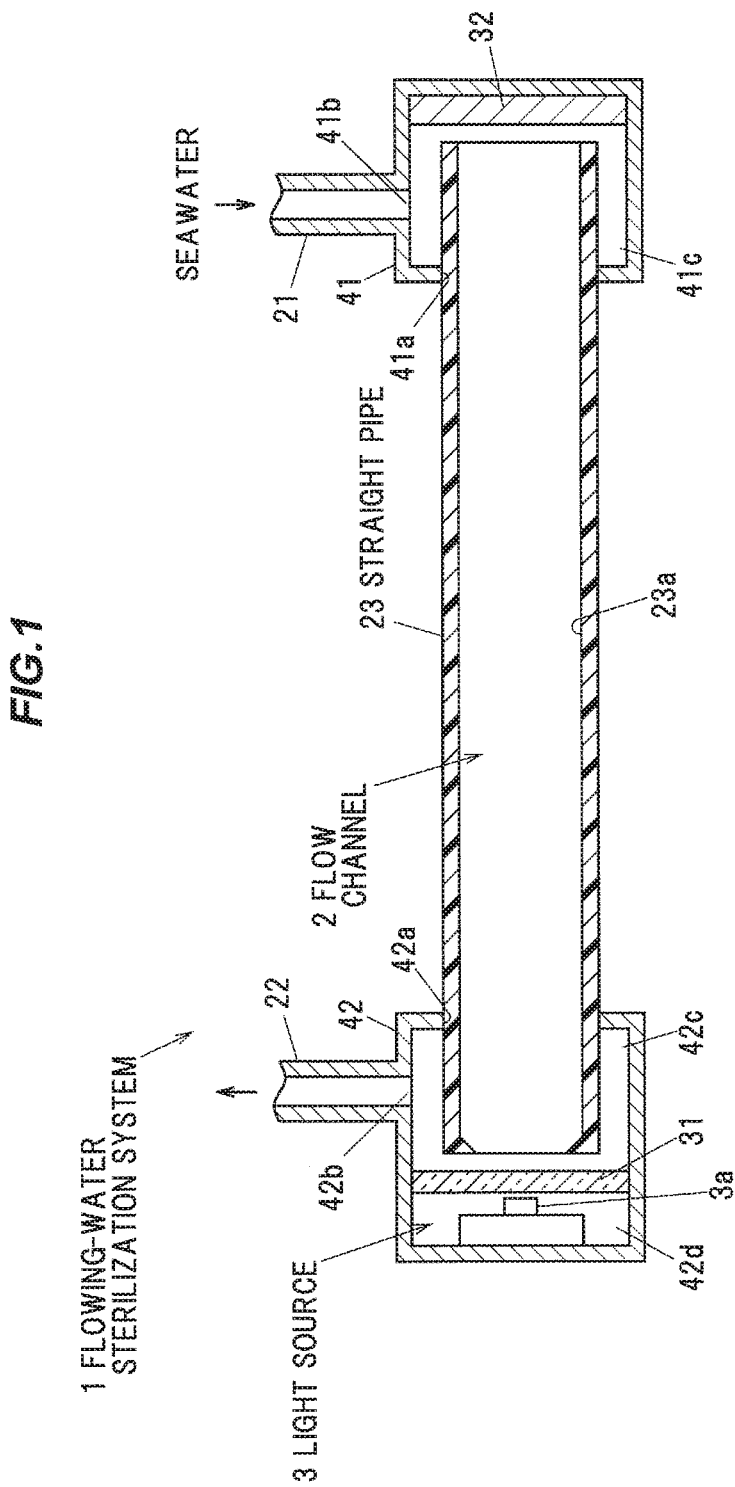

FLOWING-WATER STERILIZATION SYSTEM

CROSS REFERENCE TO RELATED APPLICATIONS

The present application is a continuation of U.S. Ser. No. 16/100,431 filed on Aug. 10, 2018 and claims the benefit of priority from Japanese Patent Application Nos. 2017-158863 and 2018-101512 and filed on Aug. 21, 2017 and May 28, 2018, respectively, the entire contents of which are incorporated herein by reference.

TECHNICAL FIELD

The invention relates to a flowing-water sterilization system which sterilizes flowing water by UV radiation.

BACKGROUND ART

Flowing-water sterilization system which sterilizes flowing water by UV radiation is conventionally known. Some of such flowing-water sterilization systems use a UV lamp as a light source to produce UV radiation (see, JP 2005/296847).

CITATION LIST

Patent Literatures

JP 2005/296847

SUMMARY OF INVENTION

Technical Problem

The flowing-water sterilization system using a UV lamp, however, has a problem that a phenomenon called fouling, in which substances are deposited on the surface of the UV lamp (the surface of quartz glass), is likely to occur particularly when sterilizing seawater including many minerals and UV is blocked by a film formed due to fouling, resulting in early degradation of sterilization performance. The present inventors examined and confirmed that, in a conventional flowing-water sterilization system provided with a UV lamp and used for seawater sterilization, a black film was formed due to fouling after about one week of use and caused degradation of sterilization capability.

It is an object of the invention to provide a flowing-water sterilization system that can prevent fouling and suppress degradation of sterilization capability.

Solution to Problem

An embodiment of the invention provides a flowing-water sterilization system, comprising:
a flow channel for passing seawater to be sterilized; and
a light source emitting ultraviolet light to irradiate the seawater passing through the flow channel,
wherein the light source comprises a light-emitting diode that emits light not including infrared light.

Advantageous Effects of Invention

According to an embodiment of the invention, a flowing-water sterilization system can be provided that can prevent fouling and suppress degradation of sterilization capability.

BRIEF DESCRIPTION OF DRAWINGS

FIG. 1 is a cross sectional view showing a flowing-water sterilization system in an embodiment of the present invention.

DESCRIPTION OF EMBODIMENTS

Figure 2A:
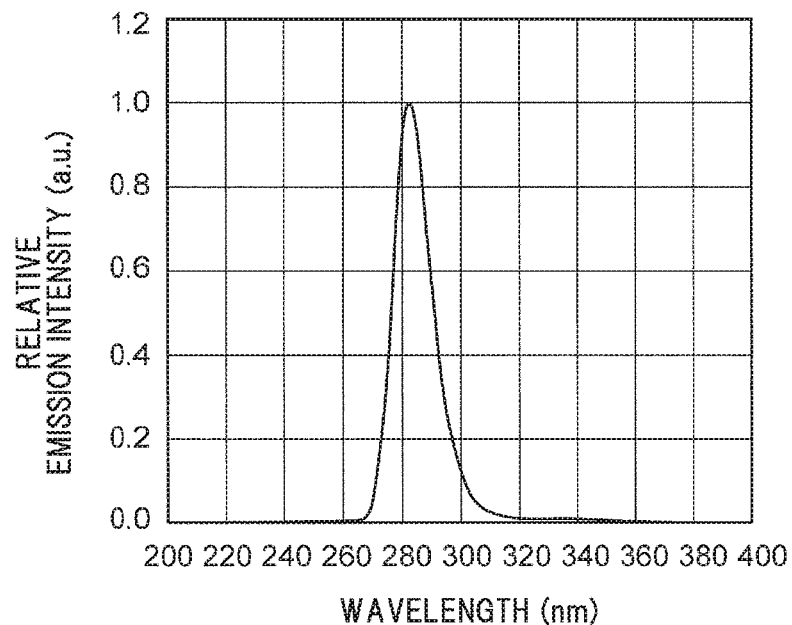
FIG. 2A is a graph showing spectral distribution of a light-emitting diode used for a light source.

Embodiments of the invention will be described below in conjunction with the appended drawings.

General Configuration of Flowing-Water Sterilization System

FIG. 1 is a cross sectional view showing a flowing-water sterilization system in an embodiment.

A flowing-water sterilization system 1 is used to sterilize seawater and is installed on, e.g., a water tank (not shown) which stores seawater. The flowing-water sterilization system 1 is provided with a flow channel 2 for passing seawater to be sterilized, and a light source 3 emitting ultraviolet light to irradiate the seawater passing through the flow channel 2.

The flow channel 2 has an inlet pipe 21 for taking in seawater, an outlet pipe 22 for discharging the seawater, and a straight pipe 23 which extends linearly and is in communication with the inlet pipe 21 and the outlet pipe 22. Both ends of the straight pipe 23 are respectively inserted into a first case 41 and a second case 42. Hereinafter, an axial direction of the straight pipe 23 is simply referred to as "the axial direction". The first case 41 and the second case 42 are formed in a substantially rectangular parallelepiped shape and also serve to fix the flowing-water sterilization system 1 in a predetermined installation position.

The first case 41 has a first straight-pipe insertion hole 41a which opens on one side in the axial direction and into which an end portion of the straight pipe 23 is inserted, a first connection hole 41b which opens in a direction perpendicular to the axial direction and is connected to the inlet pipe 21, and a first flow regulating chamber 41c in communication with the first straight-pipe insertion hole 41a and the first connection hole 41b. The straight pipe 23 is arranged so that one end thereof protrudes inside the first flow regulating chamber 41c.

The second case 42 has a second straight-pipe insertion hole 42a which opens on the other side in the axial direction and into which the other end portion of the straight pipe 23 is inserted, a second connection hole 42b which opens in a direction perpendicular to the axial direction and is connected to the outlet pipe 22, and a second flow regulating chamber 42c in communication with the second straight-pipe insertion hole 42a and the second connection hole 42b. The straight pipe 23 is arranged so that the other end thereof protrudes inside the second flow regulating chamber 42c.

The extending direction of the straight-pipe insertion holes 41a and 42a and the extending direction of the connection holes 41b and 42b are orthogonal to each other.

In other words, the extending direction of the straight pipe 23 inserted into the straight-pipe insertion holes 41*a* and 42*a* and the extending direction of the inlet pipe 21 and the outlet pipe 22 inserted into the connection holes 41*b* and 42*b* are orthogonal to each other. In the present embodiment, the inlet pipe 21 and the outlet pipe 22 extend vertically downward (in FIG. 1, toward the upper side). The first case 41 and the inlet pipe 21, and the second case 42 and the outlet pipe 22, are integrated in FIG. 1 but may be separate components. Alternatively, the inlet pipe 21 and the outlet pipe 22 may be partially integrated with the cases 41 and 42.

The inlet pipe 21 is configured that seawater is taken in from one end and the other end is connected to the first connection hole 41*b* of the first case 41. That is, the other end of the inlet pipe 21 is in communication with the one end of the straight pipe 23 via the first case 41. The seawater taken in from the inlet pipe 21 passes through the first flow regulating chamber 41*c* and is introduced into the straight pipe 23.

The outlet pipe 22 is configured that one end is connected to the second connection hole 42*b* of the second case 42 and the seawater is discharged from the other end into a water tank, etc. The one end of the outlet pipe 22 is in communication with the other end of the straight pipe 23 via the second case 42. The seawater after passing through the straight pipe 23 is introduced into the outlet pipe 22 via the second flow regulating chamber 42*c* and is discharged into a water tank, etc., from the other end of the outlet pipe 22. A pump for drawing or discharging seawater is provided on the inlet pipe 21 or the outlet pipe 22 even though it is not shown in the drawing.

The straight pipe 23 used here is formed such that at least an inner surface 23*a* thereof is formed of a material which reflects ultraviolet light emitted from the light source 3. The material which reflects ultraviolet light emitted from the light source 3 is, e.g., polytetrafluoroethylene (PTFE) which is highly reflective to ultraviolet light and excellent in durability, heat resistance and chemical resistance. The straight pipe 23 formed of PTFE and having an inner diameter of about 40 mm is used in the present embodiment.

In the second case 42, a window member 31 is provided so that the second flow regulating chamber 42*c* is divided in the axial direction. A divided space formed by providing the window member 31 is referred to as a light-source housing space 42*d*. The light source 3 is provided in the light-source housing space 42*d* so as to face the downstream end portion of the straight pipe 23 via the window member 31. In other words, in the flowing-water sterilization system 1, the light source 3 is provided downstream of the straight pipe 23 (on the outlet pipe 22 side) and emits ultraviolet light in the axial direction of the straight pipe 23. The window member 31 is highly transmissive to ultraviolet light and can be formed of, e.g., quartz glass ($SiO_2$), sapphire glass ($Al_2O_3$) or an amorphous fluorine-based resin, etc. A circuit board mounting the light source 3 is also housed in the light-source housing space 42*d*, even though it is not shown in the drawing.

A connector portion is provided on the second case 42 and a cable extending from an external power-supply unit is electrically connected to the circuit board via the connector portion, even though it is not shown in FIG. 1. The second case 42 is desirably further provided with a cooling unit for cooling the light source 3. As the cooling unit, it is possible to use a cooling device of water-cooling type configured to use seawater to be sterilized, etc., as a coolant water, or a cooling device of air-cooling type having a fan, etc. Since the circuit board and the light source 3 can be cooled by the cooling unit, heat generated by the light source 3 can be prevented from being transferred to seawater passing through the flow channel 2, thereby contributing to prevention of fouling (described later).

Meanwhile, in the first case 41, a plate-shaped reflector 32 which reflects ultraviolet light is provided along an inner wall of the first flow regulating chamber 41*c* which faces the upstream end portion of the straight pipe 23. In other words, in the present embodiment, the reflector 32 is provided upstream of the straight pipe 23 (on the inlet pipe 21 side) so as to face the light source 3. Ultraviolet light emitted from the light source 3 and propagated inside the straight pipe 23 is reflected at the reflector 32 toward the downstream side and UV irradiation efficiency is thereby enhanced. The reflector 32 may have a flat reflective surface or a curved reflective surface such as concave surface. As the reflector 32, it is possible to use a reflector formed by depositing aluminum on an aluminum base and further depositing an oxide film layer.

In the flowing-water sterilization system 1, ultraviolet light emitted from the light source 3 is transmitted through the window member 31 and propagates in the axial direction of the straight pipe 23 while being reflected by the inner surface 23*a* of the straight pipe 23. The ultraviolet light which passed through the straight pipe 23 is reflected by the reflector 32 and propagates inside the straight pipe 23 in the axial direction again. In the flowing-water sterilization system 1, seawater passing through the straight pipe 23 is continuously sterilized by the ultraviolet light propagating inside the straight pipe 23 in the axial direction.

Configuration to Prevent Fouling

Heat generated by the light source 3 is considered to have a large impact on occurrence of fouling. It is considered that UV lamp conventionally used as the light source 3 is likely to cause fouling since the UV lamp generates heat by itself and also the emitted light includes infrared light.

Thus, a light-emitting diode 3*a* which emits light not including infrared light is used as the light source 3 in the flowing-water sterilization system 1 of the present embodiment. The light-emitting diode 3*a* generates less heat than the conventionally used UV lamp. Therefore, by using the light-emitting diode 3*a* which emits light not including infrared light, it is possible to reduce the effect of heat from the light source 3 and thus possible to prevent fouling. Although the light source 3 is formed using nineteen light-emitting diodes 3*a* in the present embodiment, the number of the light-emitting diodes 3*a* used as the light source 3 is not limited thereto. In FIG. 1, only one light-emitting diode 3*a* is shown to simplify the drawing.

The light-emitting diode 3*a* generates less heat than UV lamp but still generates slight heat. Therefore, it is desirable to provide a cooling unit for cooling the light source 3. In addition, a driver circuit of the light-emitting diode 3*a* is desirably provided external to the second case 42 to reduce the effect of heat generated by the driver circuit. In the present embodiment, the driver circuit is mounted inside the external power-supply unit.

The light-emitting diode 3*a* used for the light source 3 preferably emits ultraviolet light with a wavelength of not less than 250 nm and not more than 350 nm. In other words, the light-emitting diode 3*a* used here desirably has a center wavelength or peak wavelength in a range of not less than 250 nm and not more than 350 nm. To further increase the sterilizing effect, it is desirable to use the light-emitting diode 3*a* emitting ultraviolet light with a wavelength of not less than 255 nm and not more than 285 nm which is highly effective for sterilization. Example of such light-emitting diode 3a is a light-emitting of which light-emitting layer (active layer) is formed of aluminum gallium nitride (AlGaN).

Meanwhile, a light distribution angle of the light source 3 is preferably not more than 30°. In this case, an incident angle of ultraviolet light on the inner surface 23a of the straight pipe 23 is not less than 75°, which increases reflection at the inner surface 23a of the straight pipe 23 and thereby increases efficiency of seawater sterilization. The light source 3 may include a member for adjusting the distribution angle of light emitted from the light-emitting diode 3a, such as a concave mirror.

In the meantime, light emitted from the UV lamp conventionally used as a light source generally includes light with a wavelength of 185 nm. The light with a wavelength of 185 nm is also called ozone rays and is known to have very high oxidation power. The presence of ozone rays is also considered to have a large impact on occurrence of fouling.

Therefore, in view of preventing fouling, it is desirable to use the light-emitting diode 3a which emits light not including ozone rays with a wavelength of 185 nm. It is more desirable to use the light-emitting diode 3a which emits light not including light with a wavelength of not more than 200 nm since light with a wavelength close to 185 nm also has high oxidation power. In this case, it is possible to prevent oxidation, etc., of minerals in seawater and thereby possible to prevent fouling.

Figure 2B:
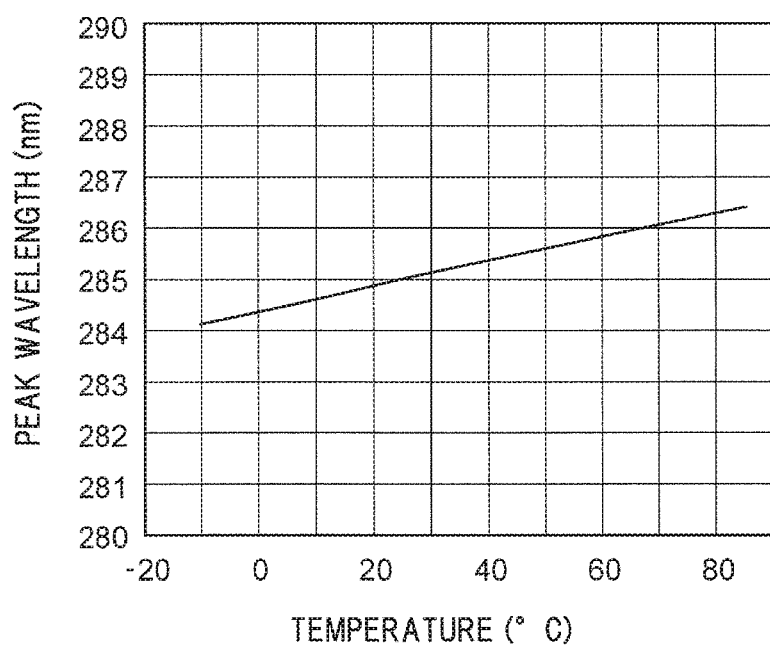
FIG. 2B is a graph showing a relation between temperature and emission wavelength of the light-emitting diode.

FIG. 2A is a graph showing spectral distribution of the light-emitting diode used as the light source 3 in the present embodiment and FIG. 2B is a graph showing a relation between temperature and emission wavelength of the light-emitting diode. FIG. 2A shows spectral distribution in a 25 degrees Celsius environment. As shown in FIGS. 2A and 2B, the light-emitting diode 3a used as the light source 3 has a peak wavelength of 285 nm in a 25 degrees Celsius environment and emits light not including infrared light or light with a wavelength of not more than 200 nm.

Figure 3:
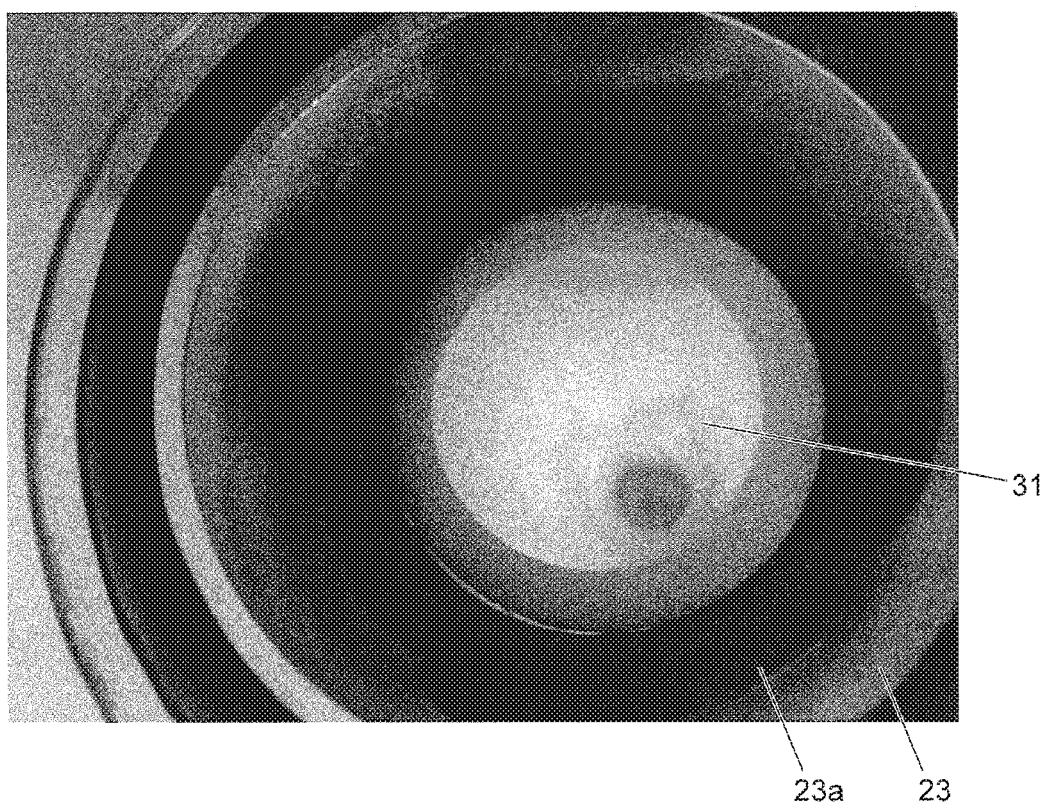
FIG. 3 is a photograph showing the flowing-water sterilization system after about five months of use.

When the present inventors carried out sterilization of seawater using the flowing-water sterilization system 1, fouling on the window member 31 or the inner surface 23a of the straight pipe 23 did not occur even after about five months of use as shown in FIG. 3, and it was confirmed that degradation of sterilization capability was prevented for a long period of time. It is considered that fouling is prevented in the flowing-water sterilization system 1 of the present embodiment since light emitted from the light-emitting diode 3a used as the light source 3 does not include infrared light or ozone rays.

Effects of the Embodiment

As described above, the light-emitting diode 3a which emits light not including infrared light is used as the light source 3 in the flowing-water sterilization system 1 of the present embodiment. It is thus possible to reduce the effect of heat from the light source 3 and thereby possible to prevent fouling. As a result, it is possible to suppress degradation of sterilization capability for a long period of time and is thereby possible to realize the flowing-water sterilization system 1 of which sterilization capability does not easily degrade and maintenance is easy.

Another Embodiment

Figure 4A:
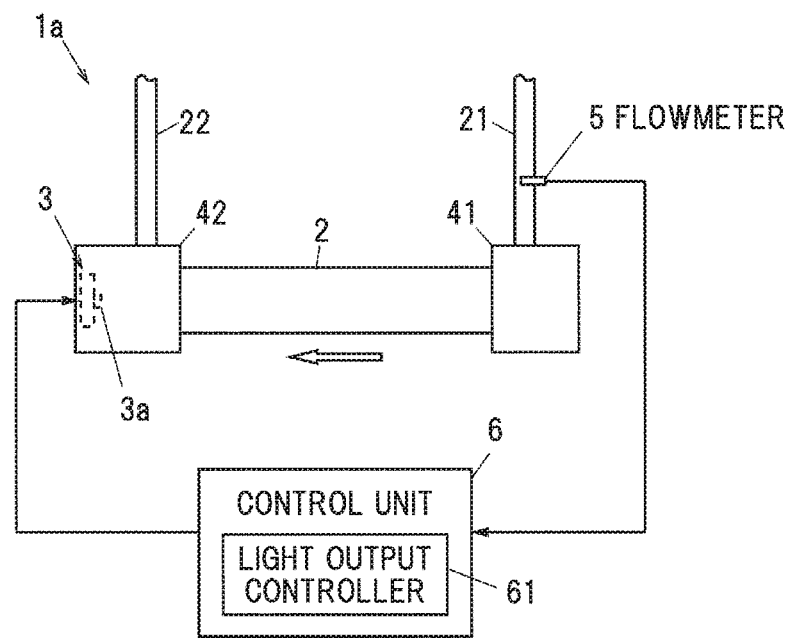
FIG. 4A is a schematic configuration diagram illustrating a flowing-water sterilization system in another embodiment of the invention.

FIG. 4A is a schematic configuration diagram illustrating a flowing-water sterilization system 1a in another embodiment of the invention. The flowing-water sterilization system 1a has the same basic configuration as the flowing-water sterilization system 1 in FIG. 1 but is further provided with a flowmeter 5 and a light output controller 61.

Scaling, which is deposition of calcium, magnesium or silica, etc., included in seawater, is known as one form of fouling. When the system is not working and the light source 3 is not producing UV radiation, there is a possibility that scaling on the window member 31, etc., occurs within a short period of time and it may not be possible to maintain stable sterilization performance. Therefore, the flowing-water sterilization system 1a is configured that light output of the light source 3 is controlled according to changes in the water flow to prevent scaling by taking advantage of characteristics of the light-emitting diode 3a that light output thereof is controlled easier than UV lamp, etc.

The flowmeter 5 is used as a flow rate-detecting unit for detecting the flow rate of seawater flowing through the flow channel 2. Although the flowmeter 5 is provided on the inlet pipe 21 in this example, the position of the flowmeter 5 is not limited thereto and the flowmeter 5 may be provided on, e.g., the outlet pipe 22. The detection signal of the flowmeter 5 is sent to a control unit 6 which mounts the light output controller 61.

The light output controller 61 controls light output of the light source 3 according to the detection signal from the flowmeter 5, i.e., the flow rate of seawater detected by the flowmeter 5. The light output controller 61 is realized by appropriately combining an arithmetic element such as CPU, a memory, a software, an interface and a storage device such as hard disk drive, etc. Although the light output controller 61 in this example is mounted on the control unit 6 which is provided separately from the second case 42 housing the light source 3, the light output controller 61 may be realized by a microcomputer, etc., mounted on the second case 42.

Figure 4B:
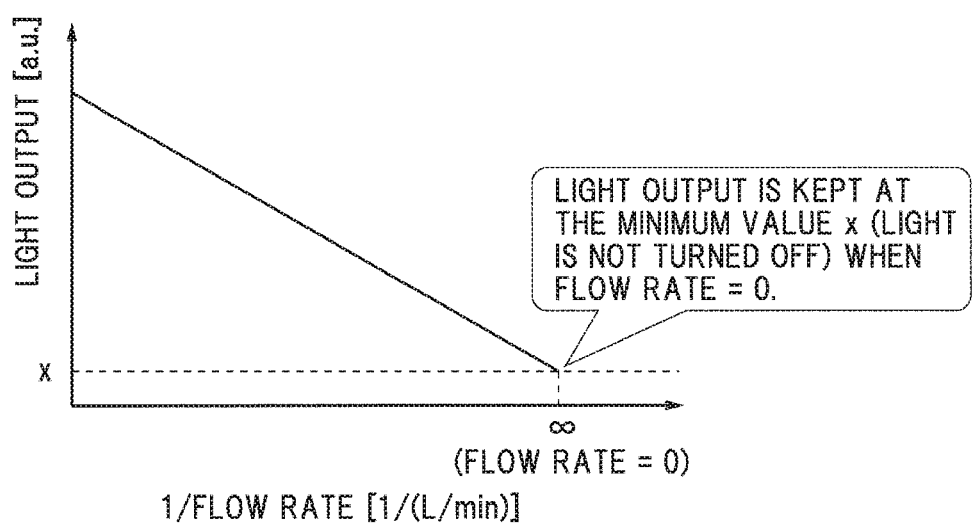
FIG. 4B is a graph showing an example of a relation between light output and flow rate.

FIG. 4B is a graph showing an example of a relation between light output and flow rate of the flowing-water sterilization system 1a. The light output controller 61 controls the light source 3 to reduce light output with decreasing the flow rate of seawater, as shown in FIG. 4B. Light output can be controlled by controlling the magnitude of electric current supplied to the light-emitting diode 3a. The relation between the flow rate of seawater (or its multiplicative inverse: 1/flow rate) and light output is not limited to that shown in the drawing and can be appropriately set.

The light output controller 61 is also configured to maintain light output of the light source 3 at a preset minimum value x when the flow rate of seawater detected by the flowmeter 5 is zero. In other words, the light output controller 61 does not turn off the light source 3 even when the flow rate of seawater flowing through the flow channel 2 is zero. The minimum value x of light output is set to a minimum light intensity at which fouling (scaling) can be prevented.

In the flowing-water sterilization system 1a, since light output of the light source 3 can be adjusted to optimal light output according to the flow rate of seawater, it is possible to increase lifetime of the light source 3 and also possible to reduce power consumption of the light source 3. In addition, in the flowing-water sterilization system 1a, since the light source 3 maintains the minimum light output even in a state that the flow rate of seawater is zero, it is possible to prevent fouling (scaling) caused by stagnation of seawater in the flow channel 2, etc., and thus possible to maintain stable sterilization performance.

Technical ideas understood from the embodiments will be described below citing the reference numerals, etc., used for the embodiments. However, each reference numeral, etc., described below is not intended to limit the constituent elements in the claims to the members, etc., specifically described in the embodiments.

[1] A flowing-water sterilization system (1), comprising: a flow channel (2) for passing seawater to be sterilized; and a light source (3) emitting ultraviolet light to irradiate the seawater passing through the flow channel (2), wherein the light source (3) comprises a light-emitting diode (3a) that emits light not including infrared light.

[2] The flowing-water sterilization system (1) defined by [1], wherein the light-emitting diode (3a) emits ultraviolet light that has a wavelength of not less than 250 nm and not more than 350 nm and does not include light with a wavelength of not more than 200 nm.

[3] The flowing-water sterilization system (1) defined by [1] or [2], further comprising: a cooling unit for cooling the light source (3).

[4] The flowing-water sterilization system (1) defined by any one of [1] to [3], wherein the flow channel (2) comprises a straight pipe (23) extending linearly, and the light source (3) is provided upstream or downstream of the straight pipe (23) and emits ultraviolet light in an axial direction of the straight pipe (23).

[5] The flowing-water sterilization system (1a) defined by any one of [1] to [4], further comprising: a flow rate-detecting unit (5) for detecting a flow rate of the seawater flowing through the flow channel (2); and a light output controller (61) that controls light output of the light source (3) according to the flow rate of the seawater detected by the flow rate-detecting unit (5).

[6] The flowing-water sterilization system (1a) defined by [5], wherein the light output controller (61) controls the light source (3) to reduce light output with decreasing the flow rate of the seawater, and maintains light output of the light source (3) at a preset minimum value when the flow rate of the seawater is zero.

Although the embodiments of the invention have been described, the invention according to claims is not to be limited to the embodiments described above. Further, please note that all combinations of the features described in the embodiments are not necessary to solve the problem of the invention.

The invention can be appropriately modified and implemented without departing from the gist thereof. For example, although the light source 3 is provided at the downstream end portion of the straight pipe 23 in the embodiment, the light source 3 may be provided at the upstream end portion of the straight pipe 23, or the light sources 3 may be provided at both the upstream and downstream end portions of the straight pipe 23.

REFERENCE SIGNS LIST

1 Flowing-Water Sterilization System
2 Flow Channel
21 Inlet Pipe
22 Outlet Pipe
23 Straight Pipe
3 Light Source
3a Light-Emitting Diode
31 Window Member
32 Reflector
5 Flow Rate-Detecting Unit
61 Light Output Controller

The invention claimed is:

1. A flowing-water sterilization system, comprising:
   a flow channel for passing seawater to be sterilized, the flow channel including a straight pipe having one end for being introduced with the seawater and the other end for discharging the seawater;
   a light source including a light-emitting diode provided to be spaced from the other end of the straight pipe so as to face the other end of the straight pipe, the light-emitting diode emitting light including ultraviolet light and no infrared light in the axial direction of the straight pipe;
   a first flow regulating chamber, wherein the one end of the straight pipe extends into a portion of the first flow regulating chamber; and
   a second flow regulating chamber comprising an outlet of the seawater, wherein the light source is within the second flow regulating chamber, and wherein the other end of the straight pipe extends into a portion of the second flow regulating chamber and is nearer the light source than the outlet of the seawater in the axial direction.

2. The flowing-water sterilization system according to claim 1, wherein the light-emitting diode emits ultraviolet light that has a peak wavelength ranging from 250 nm to 350 nm, the ultraviolet light not including light with a wavelength equal to or less than 200 nm.

3. The flowing-water sterilization system according to claim 1, further comprising a cooling unit for cooling the light source.

4. The flowing-water sterilization system according to claim 1, wherein the straight pipe extends linearly, and the light source is provided upstream of the straight pipe and emits ultraviolet light in the axial direction of the straight pipe.

5. The flowing-water sterilization system according to claim 1, further comprising:
   a flow rate-detecting unit for detecting a flow rate of the seawater flowing through the flow channel; and
   a light output controller that controls light output of the light source according to the flow rate of the seawater detected by the flow rate-detecting unit.

6. The flowing-water sterilization system according to claim 2, further comprising a cooling unit for cooling the light source.

7. The flowing-water sterilization system according to claim 2, wherein the straight pipe extends linearly, and the light source is provided upstream of the straight pipe and emits ultraviolet light in the axial direction of the straight pipe.

8. The flowing-water sterilization system according to claim 3, wherein the straight pipe extends linearly, and the light source is provided upstream of the straight pipe and emits ultraviolet light in the axial direction of the straight pipe.

9. The flowing-water sterilization system according to claim 6, wherein the straight pipe extends linearly, and the light source is provided upstream of the straight pipe and emits ultraviolet light in the axial direction of the straight pipe.

10. The flowing-water sterilization system according to claim 2, further comprising:
    a flow rate-detecting unit for detecting a flow rate of the seawater flowing through the flow channel; and
    a light output controller that controls light output of the light source according to the flow rate of the seawater detected by the flow rate-detecting unit.

11. The flowing-water sterilization system according to claim 3, further comprising:
- a flow rate-detecting unit for detecting a flow rate of the seawater flowing through the flow channel; and
- a light output controller that controls light output of the light source according to the flow rate of the seawater detected by the flow rate-detecting unit.

12. The flowing-water sterilization system according to claim 4, further comprising:
- a flow rate-detecting unit for detecting a flow rate of the seawater flowing through the flow channel; and
- a light output controller that controls light output of the light source according to the flow rate of the seawater detected by the flow rate-detecting unit.

13. The flowing-water sterilization system according to claim 6, further comprising:
- a flow rate-detecting unit for detecting a flow rate of the seawater flowing through the flow channel; and
- a light output controller that controls light output of the light source according to the flow rate of the seawater detected by the flow rate-detecting unit.

14. The flowing-water sterilization system according to claim 9, further comprising:
- a flow rate-detecting unit for detecting a flow rate of the seawater flowing through the flow channel; and
- a light output controller that controls light output of the light source according to the flow rate of the seawater detected by the flow rate-detecting unit.

15. The flowing-water sterilization system according to claim 1, further comprising:
- a reflector provided at the one end of the straight pipe so as to face the light source.

16. The flowing-water sterilization system according to claim 1, further comprising:
- a window portion provided between the light source and the other end of the straight pipe.

17. A flowing-water sterilization system, comprising:
- a flow channel for passing seawater to be sterilized, the flow channel including a straight pipe having one end for being introduced with the seawater and the other end for discharging the seawater;
- a light source including a light-emitting diode provided downstream of the straight pipe, the light-emitting diode emitting light including ultraviolet light and no infrared light in the axial direction of the straight pipe;
- a reflector provided upstream of the straight pipe so as to face the light source:
- a first flow regulating chamber, wherein the one end of the straight pipe extends into a portion of the first flow regulating chamber, and wherein the reflector is within the first flow regulating chamber; and
- a second flow regulating chamber comprising an outlet of the seawater, wherein the light source is within the second flow regulating chamber, and wherein the other end of the straight pipe extends into a portion of the second flow regulating chamber.

18. The flowing-water sterilization system of claim 15, wherein the reflector is within the first flow regulating chamber, and wherein the first flow regulating chamber comprises an inlet of the seawater, wherein the one end of the straight pipe extends into a portion of the first flow regulating chamber and is nearer the reflector than the inlet of the seawater in the axial direction.

19. The flowing-water sterilization system of claim 17, wherein the first flow regulating chamber comprises an inlet of the seawater, wherein the one end of the straight pipe extends into a portion of the first flow regulating chamber and is nearer the reflector than the inlet of the seawater in the axial direction.

20. The flowing-water sterilization system of claim 17, wherein the second flow regulating chamber comprises an outlet of the seawater, wherein the other end of the straight pipe extends into a portion of the second flow regulating chamber and is nearer the light source than the outlet of the seawater in the axial direction.

21. The flowing-water sterilization system of claim 1, wherein the first flow regulating chamber is configured so that seawater from an inlet flows only in a region defined by an inner circumferential surface of the first flow regulating chamber and an outer circumferential surface of one end of the straight pipe, and, in the second flow regulating chamber flows only in a region defined by an inner circumferential surface of the second flow regulating chamber and an outer circumferential surface of the other end of the straight pipe.

22. The flowing-water sterilization system of claim 17, wherein the first flow regulating chamber is configured so that seawater from an inlet flows only in a region defined by an inner circumferential surface of the first flow regulating chamber and an outer circumferential surface of one end of the straight pipe, and, in the second flow regulating chamber flows only in a region defined by an inner circumferential surface of the second flow regulating chamber and an outer circumferential surface of the other end of the straight pipe.

23. The flowing-water sterilization system of claim 1, wherein the seawater remains in the second flow regulating chamber, and flows in an area adjacent to the light source.

24. The flowing-water sterilization system of claim 17, wherein the seawater remains in each of the first flow regulating chamber and the second flow regulating chamber, and flows in an area adjacent to the light source in the second flow regulating chamber and flows in an area adjacent to the reflector in the first flow regulating chamber.

25. The flowing-water sterilization system of claim 1, wherein a diameter of the outlet is smaller than a diameter of the straight pipe.

26. The flowing-water sterilization system of claim 17, wherein a diameter of the of smaller than a diameter of the straight pipe.

* * * * *